US008804385B2

(12) United States Patent
Tse et al.

(10) Patent No.: US 8,804,385 B2
(45) Date of Patent: Aug. 12, 2014

(54) SMPS CONTROL IC WITH 4 TERMINALS

(75) Inventors: Chiu-Sing Celement Tse, Hong Kong (CN); On-Bon Peter Chan, Shatin (CN); Chik-Yam Lee, Tai Po (CN); Chi-Keung Tang, Tai Po (CN); Chi-Ken Kenny Lee, Tai Po (CN)

(73) Assignee: Mosway Semiconductor Limited, Shatin, New Territories, Hong Kong (CN)

( * ) Notice: Subject to any disclaimer, the term of this patent is extended or adjusted under 35 U.S.C. 154(b) by 395 days.

(21) Appl. No.: 13/204,908

(22) Filed: Aug. 8, 2011

(65) Prior Publication Data
US 2012/0049831 A1    Mar. 1, 2012

(30) Foreign Application Priority Data

Aug. 30, 2010  (CN) .......................... 2010 1 0268394

(51) Int. Cl.
*H02H 7/122*    (2006.01)
(52) U.S. Cl.
USPC .............................. 363/56.1; 363/97; 363/147
(58) Field of Classification Search
USPC ..................... 363/56.03, 56.07, 56.1, 97, 147
See application file for complete search history.

(56) References Cited

U.S. PATENT DOCUMENTS

| 5,335,162 | A | * | 8/1994 | Martin-Lopez et al. | ........ 363/97 |
| 6,611,439 | B1 | * | 8/2003 | Yang et al. | ...................... 363/41 |
| 7,035,119 | B2 | * | 4/2006 | Koike | ............... 363/19 |
| 7,242,596 | B2 | * | 7/2007 | Fujita et al. | ................ 363/21.13 |
| 7,310,244 | B2 | * | 12/2007 | Yang et al. | ...................... 363/97 |
| 7,394,670 | B2 | * | 7/2008 | Koike | ......................... 363/21.16 |
| 7,952,893 | B2 | * | 5/2011 | Hiasa | .......................... 363/21.01 |
| 8,018,745 | B2 | * | 9/2011 | Fang et al. | .................... 363/56.1 |
| 8,559,152 | B2 | * | 10/2013 | Cao et al. | ...................... 361/93.1 |
| 2011/0211376 | A1 | * | 9/2011 | Hosotani | ......................... 363/97 |
| 2012/0049831 | A1 | * | 3/2012 | Tse et al. | ...................... 323/299 |

* cited by examiner

*Primary Examiner* — Jeffrey Sterrett
(74) *Attorney, Agent, or Firm* — Alix, Yale & Ristas, LLP

(57) ABSTRACT

A switching converter IC without a built-in power switching device includes a first terminal serving as a power supply positive connection, a second terminal serving as a power supply return connection, a third terminal serving as the switch-driving connection for controlling the switching duty of an external bipolar or MOSFET power switching device and also serving as a conduit for detection of current drawn by the power switching device to thereby provide overcurrent protection. Feedback information is derived from voltage between the first and the second terminals.

5 Claims, 6 Drawing Sheets

SMPS CONTROL IC WITH 4 TERMINALS

FIELD OF THE INVENTION

The present invention relates to switching converters for use in Switched-Mode Power Supplies (SMPS).

BACKGROUND OF THE INVENTION

SMPS use switching converter ICs. Some of these ICs do not comprise a built-in power switching device at the primary side. Such ICs usually have the following five function pins or terminals:

(a) Vdd—positive power supply terminal;
(b) Vss—negative power supply, or return terminal;
(c) FE—feedback information terminal, which receives error information from the secondary side. The duty cycle of the main switching device is adjusted according to information received at this terminal;
(d) OC—over-current limit terminal for controlling the maximum current through the power switching device for conversion of energy to the secondary side; and
(e) DR—driving terminal as the driving source for controlling the switching duty cycle of the power switching device.

A typical block diagram for such an IC 10 is shown at FIG. 1. A typical application circuit diagram using a bipolar power switching device is shown at FIG. 2 and a typical application circuit diagram using a MOSFET power switching device is shown at FIG. 3.

In FIG. 1, the power-up and reference generator block 11 controls the power-up of the IC, provides operating voltage (typically regulated) to other functional blocks and generates various reference levels (voltage or current) for other circuit blocks. The output duty cycle control circuit block 12 adjusts the duty cycle at the DR terminal according to the signal received from the FE terminal and hence maintains the output of the switching converter application circuit (see FIGS. 2 and 3) at the target value.

The driver block 13 provides sufficient driving for the main switching device 14. The OC terminal samples the current through the main switching device 14, and shuts down the DR terminal in case this exceeds the target over-current limit.

Because the typical switching converter ICs as described above have five terminals this restricts the packaging options and low-cost standard package types with fewer than five terminals cannot be exploited.

OBJECTS OF THE INVENTION

It is an object of the present invention to overcome or substantially ameliorate the above disadvantage and/or more generally to provide improved switching converter ICs.

DISCLOSURE OF THE INVENTION

There is disclosed herein a switching converter IC without a built-in power switching device, comprising:
a first terminal serving as a power supply positive connection;
a second terminal serving as a power supply return connection;
a third terminal serving as the switch-driving connection for controlling the switching duty of an external bipolar or MOSFET power switching device, and also serving as a conduit for detection of current drawn by the power switching device to thereby provide overcurrent protection; wherein feedback information is derived from voltage between the first and the second terminals.

There is further disclosed herein a combination of the above switching converter IC and a bipolar power switching device having its base connected to the third terminal.

There is further disclosed herein a combination of the above and a MOSFET power switching device having its gate connected to the third terminal.

Such combination might further comprise gate-to-source voltage control at the MOSFET power switching device.

Preferably said voltage control is provided by a Zener diode connected across the gate and source of the MOSFET power switching device.

There is further disclosed herein a switching converter IC without a built-in power switching device, comprising:
a first terminal serving as a power supply positive connection;
a second terminal serving as a power supply return connection;
a third terminal serving as the switch-driving connection for controlling the switching duty of an external power switching device;
a fourth terminal serving as a conduit for detection of current drawn by the power switching device to thereby provide overcurrent protection;
wherein feedback information is derived from voltage between the first and the second terminals.

There is further disclosed herein a combination of the above switching converter IC and a power switching device having its base connected to the third terminal.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

The invention aims at reducing the total number of terminals from five to three, but a viable four-terminal version is also presented. This makes it possible to package the device in common low cost package types such as TO-92, TO-5, TO-218, TO-220, TO-225, TO-264, SOT-23, etc.

In order to reduce the total number of terminals without reducing functionality, selected terminals need to be multi-functional in nature.

Figure 1:
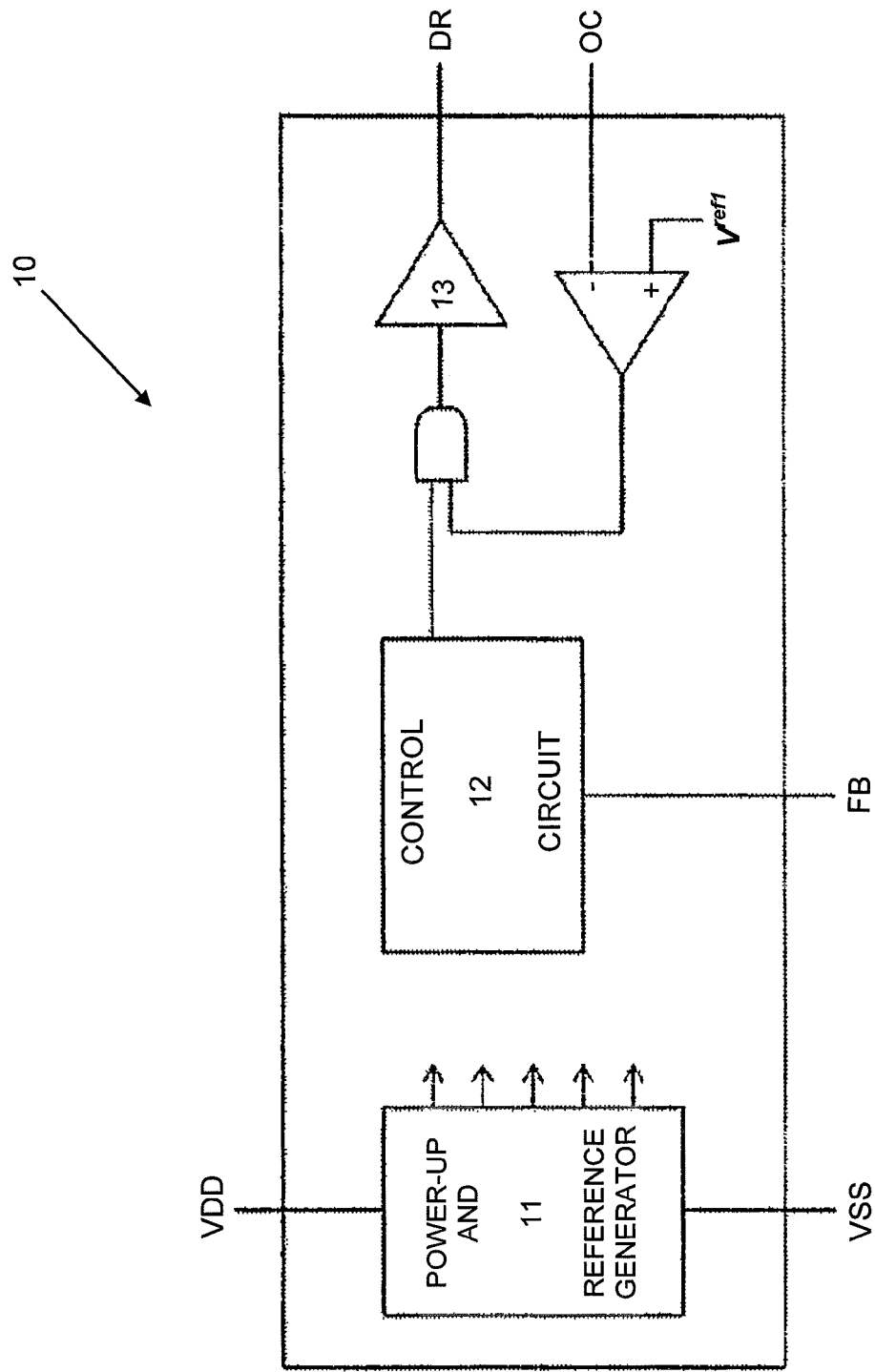
FIGS. 1, 2, and 3 depict prior art implementations as discussed above.
Figure 2:
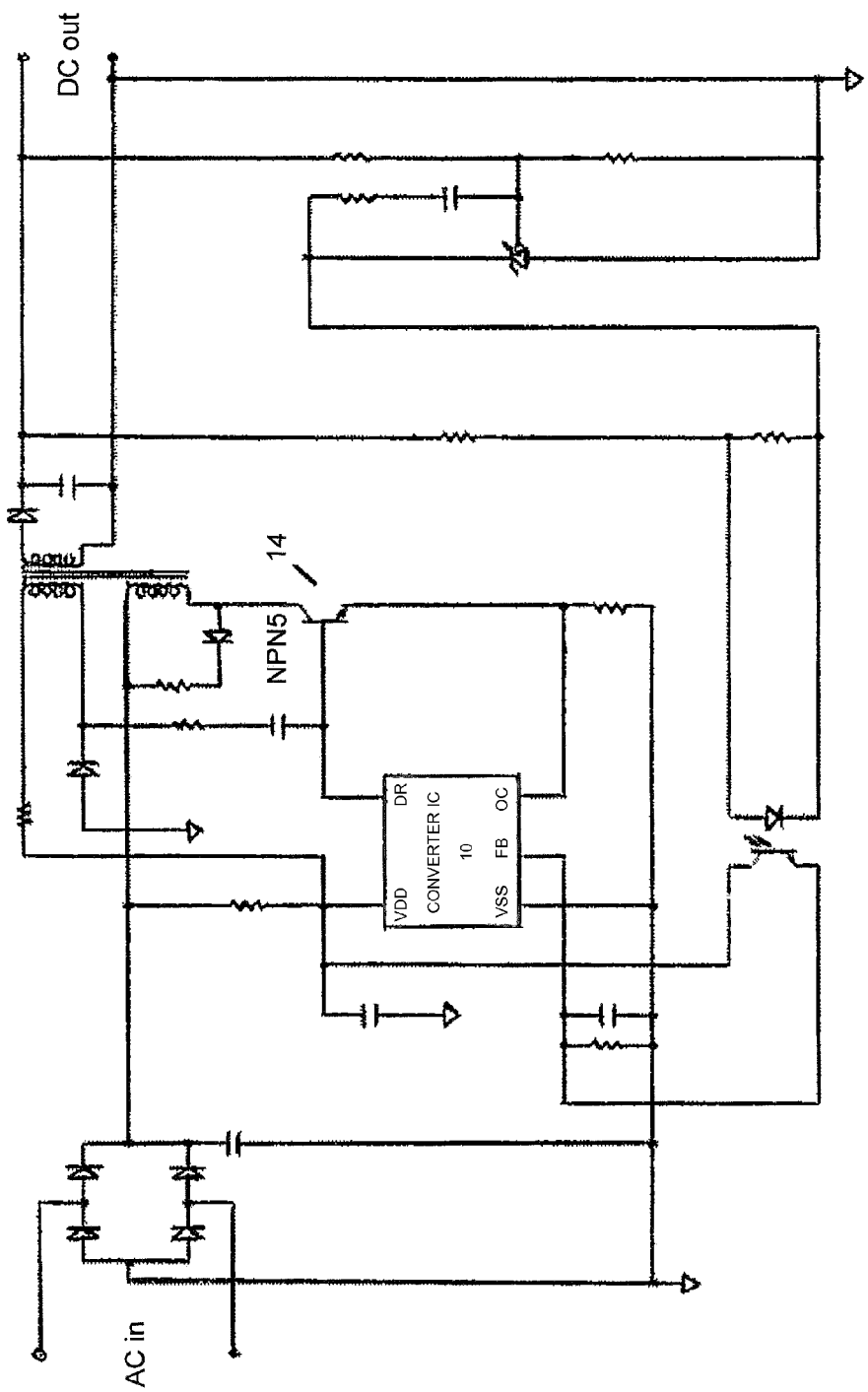
Figure 3:
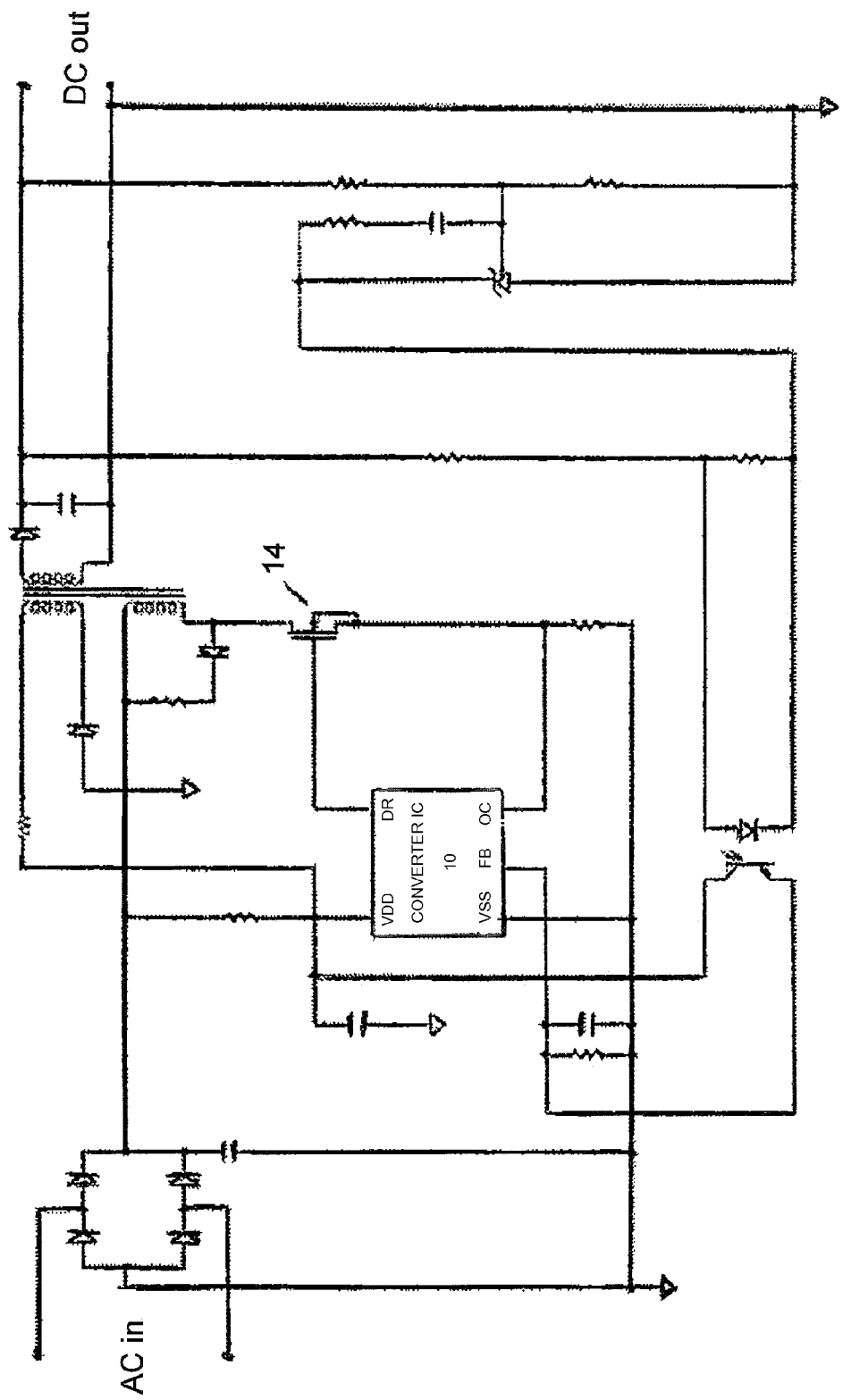
Figure 4:
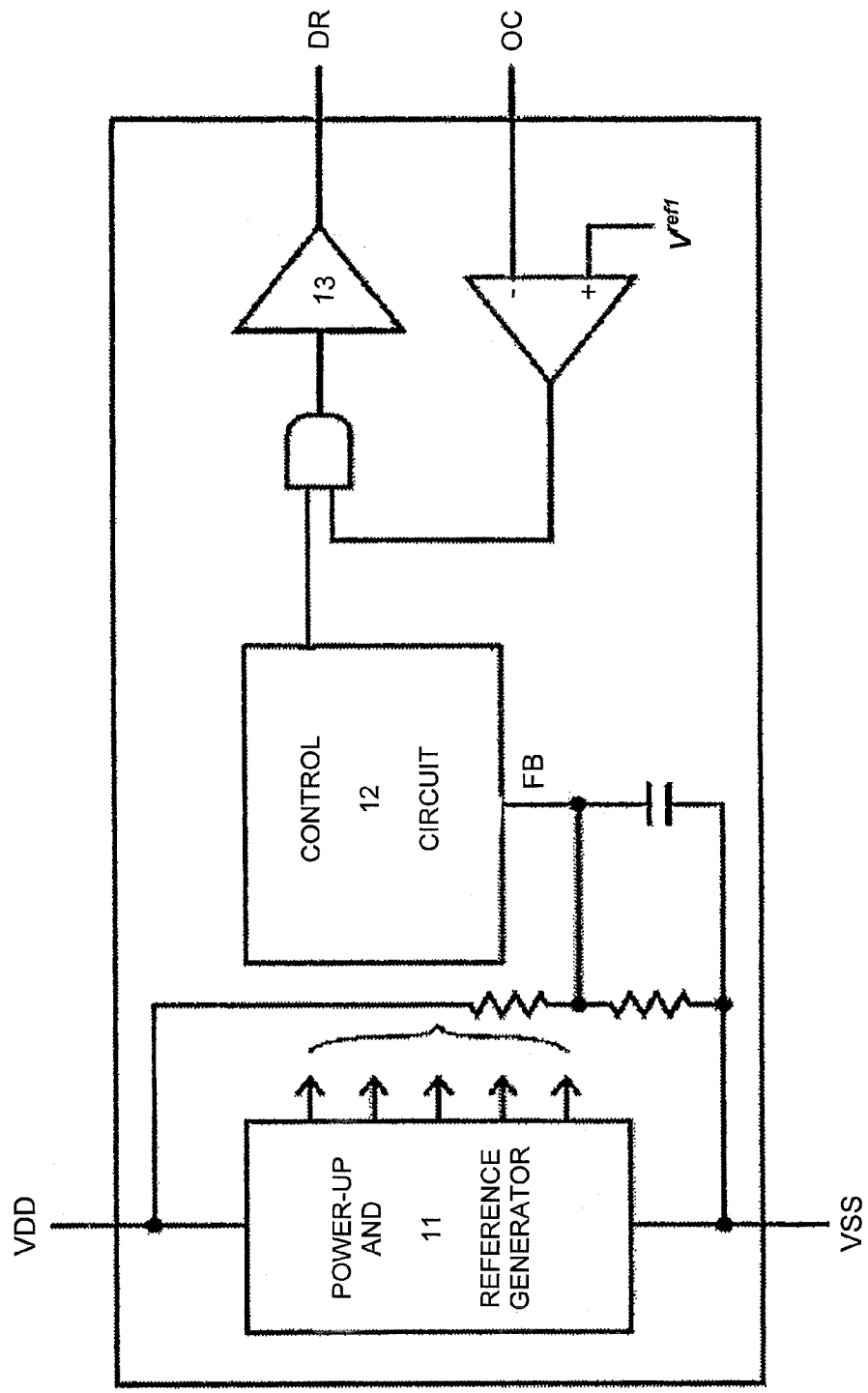
FIG. 4 is a schematic circuit block diagram of a four-terminal switching converter IC.

A primary sensing technique can be used to estimate the feedback information in such a way that the feedback information can be derived from the Vdd terminal and hence the FE terminal can be eliminated. This reduces the terminal count from five to four and the block diagram is as shown at FIG. 4.

Figure 5:
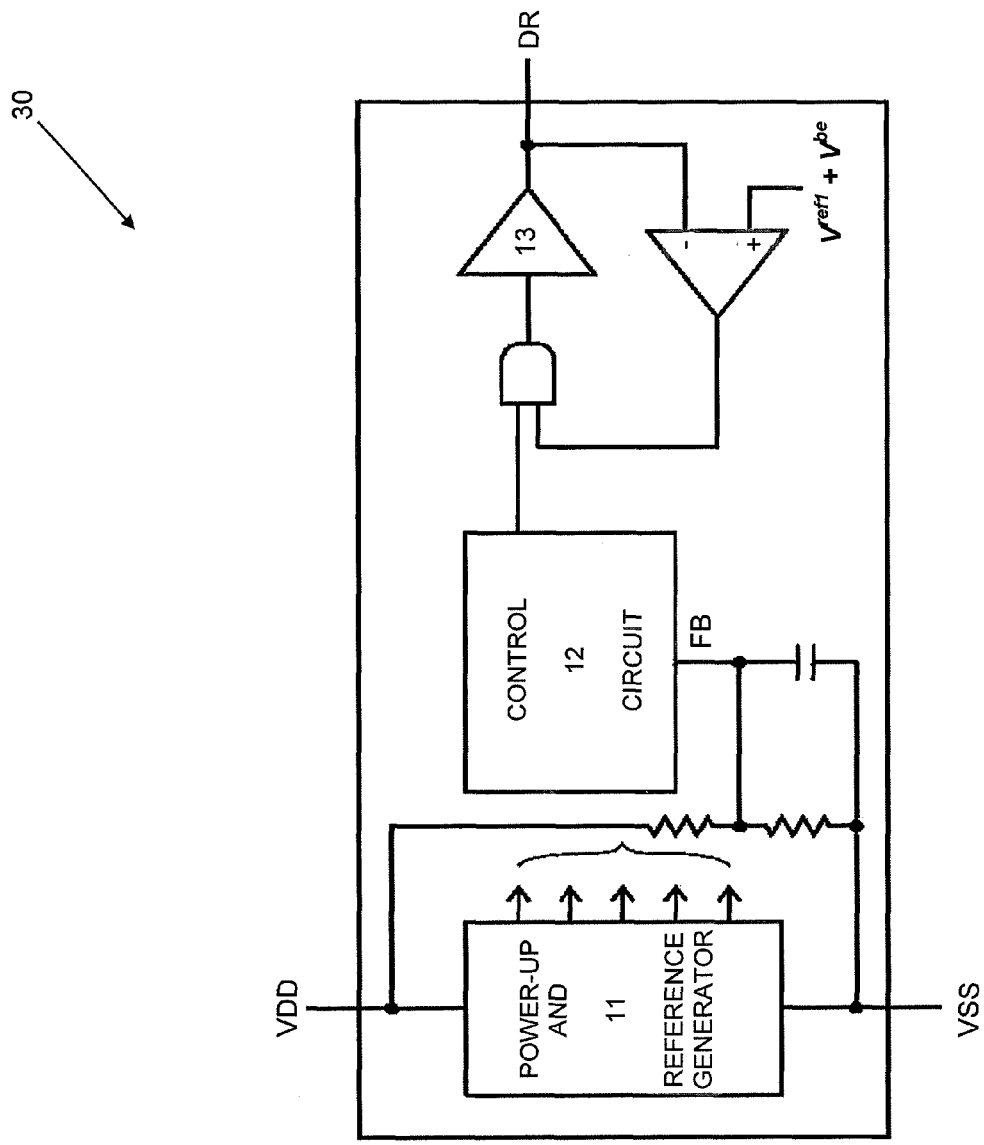
FIG. 5 is a schematic circuit block diagram of a three-terminal switching converter IC.

By using a bipolar transistor as the power switching device, the power switching device current can be estimated by the voltage at the base of the bipolar transistor using the following formula:

$$I = Ve/Re = (Vb - Vbe)/Re$$

where Vbe at desired switching can be estimated according to information in the available manufacturer's data sheet for a particular bipolar transistor. This further reduces the terminal count from four to three and the block diagram is shown at FIG. 5.

By using a MOSFET as the power switching device, the power switching device current can be estimated by the voltage at the gate of the MOSFET using the following formula:

$$I=Vs/Rs=(Vg-Vgs)/Rs$$

where Vgs at desired switching can be controlled by adding an external device such as a Zener diode across the gate and source terminals if the MOSFET. This further reduces the terminal count from four to three and the block diagram is shown at FIG. 5.

Figure 6:
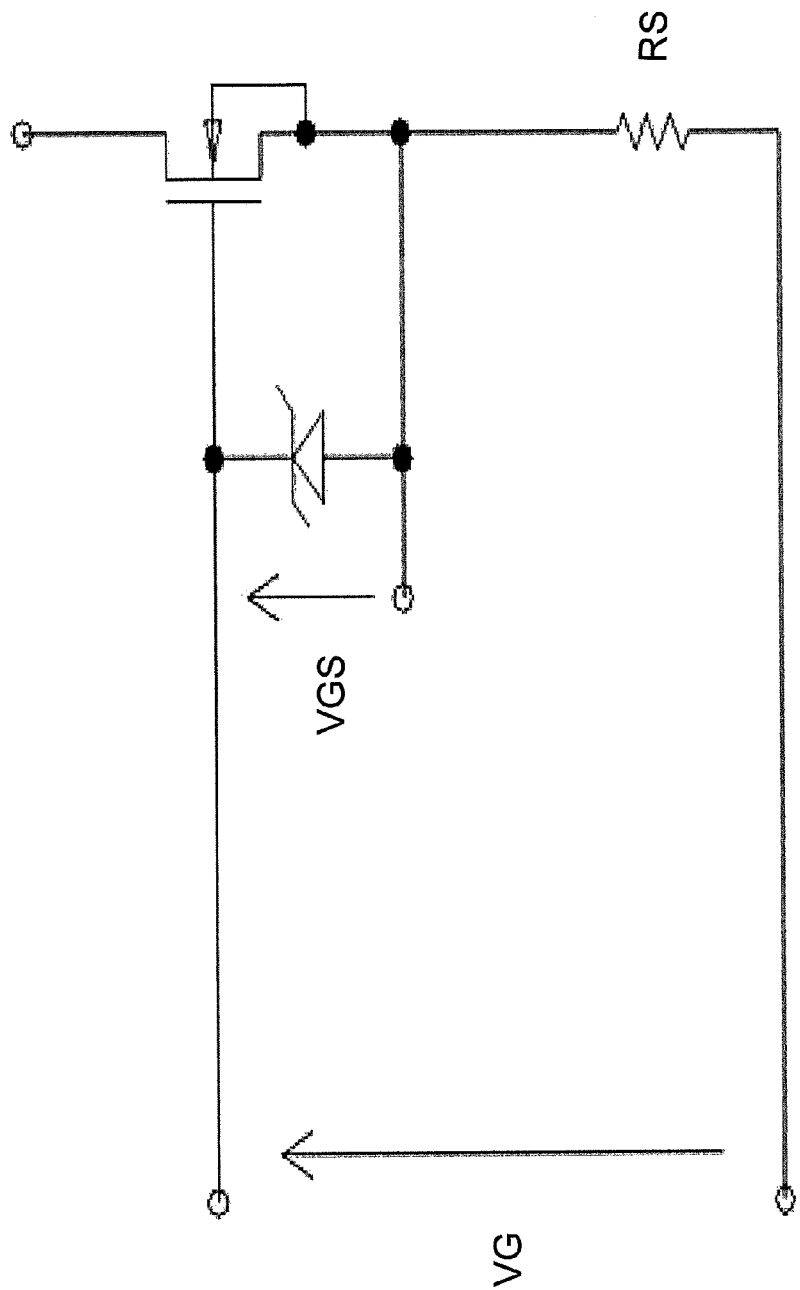
FIG. 6 is a schematic circuit block diagram showing voltage control across the gate and source of a MOSFET.

An example illustrating how to control the Vgs is shown in FIG. 6.

Control of Vgs may also be achieved by other means such as driving the gate by a constant current source together with a resistor connected across the gate and source terminals. All other circuit means fall within the scope of controlling the Vgs in this invention.

The invention claimed is:

1. A switching converter IC without a built-in power switching device, comprising:

a first terminal serving as a power supply positive connection;

a second terminal serving as a power supply return connection;

a third terminal serving as the switch-driving connection for controlling the switching duty of an external bipolar or MOSFET power switching device, and also serving as a conduit for detection of current drawn by the power switching device to thereby provide overcurrent protection; wherein feedback information is derived from voltage between the first and the second terminals.

2. In combination with the switching converter IC of claim 1 a bipolar power switching device having its base connected to the third terminal.

3. In combination with the switching converter IC of claim 1 a MOSFET power switching device having its gate connected to the third terminal.

4. The combination of claim 3, further comprising gate-to-source voltage control at the MOSFET power switching device.

5. The combination of claim 4, wherein said voltage control is provided by a Zener diode connected across the gate and source of the MOSFET power switching device.

* * * * *